Patented Sept. 7, 1948

2,448,641

UNITED STATES PATENT OFFICE 2,448,641

ALKYLATION OF CYCLIC UNSATURATED HYDROCARBONS USING ALKALI METAL CATALYST

Gerald M. Whitman, Claymont, Del., assignor to E. I. du Pont de Nemours & Company, Wilmington, Del., a corporation of Delaware No Drawing. Application February 27, 1946, Serial No. 650,729

12 Claims. (Cl. 260—666)

This invention relates to the alkylation of hydrocarbons and more particularly to the alkylation of certain substituted cyclic hydrocarbons.

Previously known methods for the alkylation of carbocyclic compounds using acidic catalysts of the Friedel-Crafts type, such as sulfuric acid, phosphoric acid and hydrogen fluoride tend to bring about almost exclusively reactions involving the cyclic structure. Toluene, for example, reacts with olefins in the presence of aluminum chloride to form polyalkyl compounds. Furthermore, known alkylation techniques bring about isomerization of alkyl side chains, e. g. conversion of n-propyl groups to isopropyl groups. This invention provides a simple method for the preferential alkylation of aliphatic groups or structures in carbocyclic compounds.

An object of this invention is to provide a novel method for alkylating certain aromatic and hydroaromatic hydrocarbons. A further object is to provide a method for alkylating aromatic and hydroaromatic hydrocarbons having at least two hydrogens on a carbon which is directly attached to a nuclear carbon atom which in turn is attached by a double bond to another nuclear carbon atom. Another object is to provide a catalytic method for alkylating this type of aromatic and hydroaromatic hydrocarbon with a monoolefin hydrocarbon. A still further object is to provide a method for the preferential alkylation of alkyl substituted aromatic hydrocarbons in the side chain. A specific object is to provide a catalytic method for alkylating toluene, and similar alkyl substituted monocyclic aromatic hydrocarbons, in the side chain with ethylene. Other objects will appear hereinafter.

The above objects are broadly accomplished by reacting in a closed reactor a cyclic hydrocarbon selected from the class consisting of aromatic and hydroaromatic hydrocarbons having at least two hydrogens on a carbon which is directly attached by a single bond to a nuclear carbon atom which in turn is attached by a double bond to another nuclear carbon atom, with the desired monoolefin hydrocarbon at temperatures in the range of 150°–450° C., and at superatmospheric pressures, preferably of 50–3000 atms., in the presence of 0.1 to 20% of an alkali metal as a catalyst, based on the weight of the aromatic or hydroaromatic hydrocarbon.

In carrying out the process of this invention it is necessary to operate under superatmospheric pressures. The operating requirements, therefore comprise means for compressing the monoolefin hydrocarbon, pressure resistant reaction vessels, heating and agitating means for such vessels, and appropriate connecting lines, gauges, controlling valves and the like. If desired, suitable pumps or injectors may be provided for adding solutions or suspensions of the alkali metal catalyst, or additional aromatic or hydroaromatic hydrocarbon, to the reactor. For continuous types of reactors, which may assume any of the various forms, suitable pumps and metering devices are provided.

The reactants employed in practicing this invention comprise a monoolefin hydrocarbon, an aromatic or hydroaromatic hydrocarbon having at least two hydrogens on a carbon which is directly attached by a single bond to a nuclear carbon atom, which in turn is attached by a double bond to another nuclear carbon atom, and an alkali metal as a catalyst. The reactants may be brought into mutual contact in a reaction zone in any order of addition and may be preheated or not, separately or mixed, before the respective addition to the reaction zone. The following more detailed description illustrates one specific manner of carrying out the batchwise operation of the process of this invention.

A pressure resistant reaction vessel is charged with the desired aromatic or hydroaromatic compound and catalyst. This charging operation is preferably carried out after purging the reaction vessel of air with deoxygenated nitrogen or other inert gas. In order to prevent entrance of air, the charging is usually conducted under a blanket of inert gas. Alternatively, the reaction charge can be sucked into the closed, evacuated reaction vessel by use of a loading block. The vessel is then closed, evacuated, placed in a shaker machine, provided with a heater, and connected to a reservoir of monoolefin hydrocarbon. Controlling and recording thermocouples are placed in position, the vessel pressured with the monoolefin hydrocarbon and heating and agitation are started. The course of the reaction may be followed by the pressure drop due to utilization of the monoolefin hydrocarbon. The pressure may be maintained in the desired range by any of the several means, such as by addition of monoolefin hydrocarbon from high pressure storage, by injecting aromatic or hydroaromatic hydrocarbon, or by injecting a mixture of monoolefin hydrocarbon and hydroaromatic or aromatic hydrocarbon. At the end of the reaction, which is marked by cessation of pressure drop, the vessel is cooled, bled of excess monoolefin hydrocarbon, opened, and the reaction mixture discharged. The catalyst is separated by filtration and the product isolated by fractional distillation or other means known to those skilled in the art.

The invention is further illustrated by the following examples in which the amounts are expressed in parts by weight, unless otherwise specified.

Example I

A mixture of 93 parts of toluene and 8 parts of metallic sodium is heated for 17 hours in a pressure vessel under 900 to 1000 atm. pressure of ethylene at 225° C. During this period a total pressure drop of 540 atm. occurs, the vessel being repressured with ethylene periodically to maintain the pressure in the indicated range. At the end of the reaction the reactor is allowed to cool, opened, and the contents discharged and filtered. The filtrate is fractionally distilled, giving 23 parts of toluene, B. P. 109° to 111° C., 14 parts of a fraction (I) B. P. 152° to 163° C. and $n_D^{34.5°}$ 1.4849, and 22 parts of fraction (II) B. P. 163° to 175° C. and $n_D^{34.5°}$ 1.4831. Fraction (I) on redistillation yields n-propyl benzene (B. P. 156.8°–158° C., $n_D^{25}$ 1.4888), which on oxidation with potassium permanganate yields benzoic acid, M. P. 122.2°–123.1° C., and which when treated by the procedure described in J. Am. Chem. Soc. 57, 940 (1925), gives a solid derivative having a melting point of 123°–124° C. and a neutral equivalent of 260. The product of the reference formed by similar treatment of n-propyl benzene has a melting point of 125° C. and a theoretical neutral equivalent of 268.

Redistillation of fraction (II) gives 3-phenylpentane, B. P. 186° C., $n_D^{25}$ 1.4855. Prolonged oxidation with potassium permanganate solution gives benzoic acid, showing that alkylation has occurred only in the side chain.

Example II

A mixture of 82 parts of cyclohexene and 8 parts of metallic sodium is heated for 17 hours under 900 to 1000 atm. pressure of ethylene at 225° C. During this time a total pressure drop of 280 atm. occurs, the vessel being repressured with ethylene as needed to maintain the pressure within the indicated range. Fractionation of the filtered reaction products gives 33 parts of cyclohexene, B. P. 79°–80° C., and 19 parts of 3-ethylcyclohexene-1, B. P. 129.7°–130.5° C., $n_D^{28.7}$ 1.4475, iodine number 230.2 (theoretical for 3-ethylcyclohexene-1, 230.8).

Example III

A mixture of 93 parts of toluene and 8 parts of metallic sodium is heated in a pressure tube under 250 atmospheres ethylene pressure at 225° C. for 10 hours. The tube is repressured with ethylene periodically to maintain the above pressure. The reaction product is a liquid containing no appreciable ethylene polymer. Fractional distillation gives 50 parts of toluene and 31.5 parts of n-propyl benzene, B. P. 152°–159° C. and $n_D^{24}$ 1.4898, which represents a conversion of 26% and a yield of 57%.

Example IV

Example III is duplicated, except that the reaction is carried out at 250° C. and 250 atmospheres ethylene pressure. Upon distillation of the reaction mixture there is obtained 94 parts of 3-phenylpentane, B. P. 186°–188° C. and $n_D^{25}$ 1.4868, which represents a conversion of 63.5%.

The aromatic and hydroaromatic hydrocarbons used in the practice of this invention are those having at least two hydrogens on a carbon which is directly attached by a single bond to a nuclear carbon atom which in turn is attached by a double bond to another nuclear carbon atom. Specific compounds of this class are toluene, ethyl benzene, n-propyl benzene, n-butyl benzene, n-amyl benzene, the xylenes, tetrahydronaphthalene, methyl naphthalene, mesitylene, 3-methylcyclohexene-1, 3-ethylcyclohexene-1, 3-propylcyclohexene-1, 9,10-dihydrophenanthrene, diphenylmethane, phenylcyclohexylmethane, 1,2-dihydrobenzene, 1,4-dihydrobenzene, cyclopentadiene, and the like.

In place of ethylene there can be used any other monoolefin hydrocarbon and suitable examples are propylene, butylene, amylene and the like. The monoolefins may contain small amounts of ethane, propane, nitrogen, hydrogen, carbon dioxide or oxygen. Oxygen however in concentrations above 1000 parts/million is detrimental to the reaction. Consequently, monoolefins purified to contain less than 100 parts/million, generally less than 50 parts/million and preferably less than 10 parts/million of oxygen are employed. The monoolefin may be conveniently purified by scrubbing, by catalytic removal of the impurities, or by distillation.

At least one mole of the monoolefin is theoretically required per reactive methyl or methylene group in the aromatic or hydroaromatic hydrocarbon to obtain complete utilization of the aromatic or hydroaromatic hydrocarbon. In actual practice, however, an excess of the monoolefin is usually maintained in the reaction mixture. It is possible though to operate maintaining an excess of the aromatic or hydroaromatic hydrocarbon in the reaction mixture, and these conditions tend to favor formation of the monoalkylated product.

As catalysts for the reaction there may be used any alkali metal such as lithium, sodium, potassium, or rubidium. Of these sodium is preferred because of its low cost, availability, and effectiveness. The amount of catalyst will generally vary from 0.10 to 20% by weight of the cyclic hydrocarbon and preferably from 2 to 10%.

The temperatures and pressures employed in the practice of this invention are interdependent variables. As a rule, the process is operated at temperatures within the range of 150° to 450° C., preferably at temperatures in the range of 175° to 300° C., and at superatmospheric pressures in the range between 50 to 3000 atmospheres. In view of the favorable influence of high pressures on the rates of reaction, the pressures usually employed in practice range from 150 to 1500 atmospheres because under these conditions satisfactory reaction rates are obtained at conveniently low temperatures.

The nature of the product of reaction depends to some extent upon the pressure and temperature conditions employed. Thus, in the alkylation of toluene with ethylene, the use of temperatures in excess of 225° C. and pressures of from 50 to 1000 atm. favors the formation of 3-phenylpentane. On the other hand, temperatures of 200–225° C. and pressures of 50 to 500 atm. favor the formation of n-propylbenzene. The effect of the pressure and temperature conditions upon the proportion of these products is illustrated by Examples I, III and IV.

The process of this invention is particularly valuable for the preferential alkylation in the side chain of alkyl substituted aromatic hydrocarbons. The alkylated compounds produced by the present process are valuable in motor fuels and in chemical syntheses. The alkylation of hydroaromatic compounds such as cyclohexene on methylene groups alpha to the ring double bond provides a novel route to alkyl substituted cycloolefins suitable for oxidation to dicarboxylic acids and for other chemical uses.

As many apparently widely different embodiments of this invention may be made without departing from the spirit and scope thereof, it is to be understood that I do not limit myself to the specific embodiments thereof except as defined in the appended claims.

I claim:

1. A method for the preferential alkylation of cyclic hydrocarbons on methylene and alkyl groups alpha to a ring double bond which comprises bringing into contact in a reaction zone an alkali metal catalyst, a monoolefin hydrocarbon and a cyclic hydrocarbon having at least two hydrogens on a carbon atom which is directly attached by a single bond to a nuclear carbon atom which in turn is attached by a double bond to another nuclear carbon atom, and selected from the class consisting of aromatic and hydroaromatic hydrocarbons, heating the mixture of hydrocarbons and alkali metal catalyst in said reaction zone at a temperature of 150° to 450° C. under superatmospheric pressure of 50 to 3000 atmospheres, collecting the reaction products and isolating therefrom an alkylated cyclic hydrocarbon formed by condensation of the olefin with the cyclic hydrocarbon on a group alpha to the ring double bond as aforesaid.

2. A method as set forth in claim 1 in which the alkali metal is metallic sodium.

3. A method as set forth in claim 2 in which said superatmospheric pressure is within the range of 150 to 1500 atmospheres.

4. A method for the preferential alkylation of cyclic hydrocarbons on methylene and alkyl groups alpha to a ring double bond which comprises bringing into contact in a reaction zone a metallic sodium catalyst, ethylene and a cyclic hydrocarbon having at least two hydrogens on a carbon atom which is directly attached by a single bond to a nuclear carbon atom which in turn is attached by a double bond to another nuclear carbon atom, and selected from the class consisting of aromatic and hydroaromatic hydrocarbons, heating the mixture of hydrocarbons and metallic sodium catalyst in said reaction zone at a temperature of 150° to 450° C. under superatmospheric pressures of 50 to 3000 atmospheres, collecting the reaction products and isolating therefrom an alkylated cyclic hydrocarbon formed by condensation of ethylene with the cyclic hydrocarbon on a group alpha to the ring double bond as aforesaid.

5. A method for the preferential alkylation of alkyl substituted aromatic hydrocarbons in the side chain which comprises bringing into contact in a reaction zone a metallic sodium catalyst, a monoolefin hydrocarbon and an alkyl substituted aromatic hydrocarbon having at least two hydrogens on a carbon which is directly attached by a single bond to a nuclear carbon atom which in turn is attached by a double bond to another nuclear carbon atom, heating the mixture of hydrocarbons and metallic sodium catalyst in said reaction zone at a temperature of 150° to 450° C. under superatmospheric pressure of 50 to 3000 atmospheres, collecting the reaction products and isolating therefrom an alkylated aromatic hydrocarbon formed by condensation of the olefin on the side chain of the aromatic hydrocarbon.

6. A method for the preferential alkylation of an alkyl benzene in the side chain which comprises bringing into contact in a reaction zone a metallic sodium catalyst, a monoolefin hydrocarbon and an alkyl benzene having at least two hydrogens on a carbon which is directly attached by a single bond to a nuclear carbon atom which in turn is attached by a double bond to another nuclear carbon atom, heating the mixture of hydrocarbons and metallic sodium catalyst in said reaction zone at a temperature of 150° to 450° C. under superatmospheric pressure of 50 to 3000 atmospheres, collecting the reaction products and isolating therefrom an alkylated alkyl benzene formed by condensation of the olefin on the side chain of said alkyl benzene.

7. A method for the preferential alkylation of an alkyl benzene in the side chain which comprises bringing into contact in a reaction zone a metallic sodium catalyst, ethylene and an alkyl benzene having at least two hydrogens on a carbon which is directly attached by a single bond to a nuclear carbon atom which in turn is attached by a double bond to another nuclear carbon atom, heating the mixture of hydrocarbons and metallic sodium catalyst in said reaction zone at a temperature of 150° to 450° C. under superatmospheric pressure of 50 to 3000 atmospheres, collecting the reaction products and isolating therefrom an alkylated alkyl benzene formed by condensation of ethylene on the side chain of said alkyl benzene.

8. A method for the preferential alkylation of toluene in the side chain which comprises bringing into contact in a reaction zone a metallic sodium catalyst, ethylene and toluene, heating the mixture of hydrocarbons and metallic sodium catalyst in said reaction zone at a temperature of 150° to 450° C. under superatmospheric pressure of 50 to 3000 atmospheres, collecting the reaction products and isolating therefrom at least one of the products n-propyl-benzene and 3-phenylpentane.

9. A method for the preferential alkylation of toluene in the side chain which comprises bringing into contact in a reaction zone a metallic sodium catalyst, ethylene and toluene, heating the mixture of hydrocarbons and metallic sodium catalyst in said reaction zone at a temperature of 225° to 450° C. under superatmospheric pressure of 50 to 1000 atmospheres, collecting the reaction products and isolating therefrom 3-phenylpentane.

10. A method for the preferential alkylation of toluene in the side chain which comprises bringing into contact in a reaction zone a metallic sodium catalyst, ethylene and toluene, heating the mixture of hydrocarbons and metallic sodium catalyst in said reaction zone at a temperature of 200° to 225° C. under superatmospheric pressure of 50 to 500 atmospheres, collecting the reaction products and isolating therefrom n-propylbenzene.

11. A method for the preferential alkylation of hydroaromatic hydrocarbons on a carbon atom alpha to a ring double bond which comprises bringing into contact in a reaction zone a metallic sodium catalyst, a monoolefin hydrocarbon and a hydroaromatic hydrocarbon having at least two hydrogens on a carbon which is directly attached by a single bond to a nuclear carbon atom which in turn is attached by a double bond to another nuclear carbon atom, heating the mixture of hydrocarbons and metallic sodium catalyst in said reaction zone at a temperature of 150° to 450° C. under superatmospheric pressure of 50 to 3000 atmospheres, collecting the reaction products and isolating therefrom an alkylated hydroaromatic hydrocarbon formed by condensation of the olefin with the hydroaromatic hydrocarbon on a carbon atom alpha to said ring double bond.

12. A method for the preferential alkylation of cyclohexene which comprises bringing into contact in a reaction zone a metallic sodium catalyst, ethylene and cyclohexene, heating the mixture of hydrocarbons and metallic sodium catalyst in said reaction zone to a temperature of 175 to 300° C. under superatmospheric pressure of 150 to 1500 atmospheres, collecting the reaction products and isolating therefrom 3-ethylcyclohexene-1.

GERALD M. WHITMAN.

REFERENCES CITED

The following references are of record in the file of this patent:

UNITED STATES PATENTS

| Number | Name | Date |
|---|---|---|
| 1,934,123 | Hofmann et al. | Nov. 7, 1933 |
| 2,287,931 | Corson et al. | June 30, 1942 |

FOREIGN PATENTS

| Number | Country | Date |
|---|---|---|
| 799,016 | France | May 30, 1936 |